Figure 1:
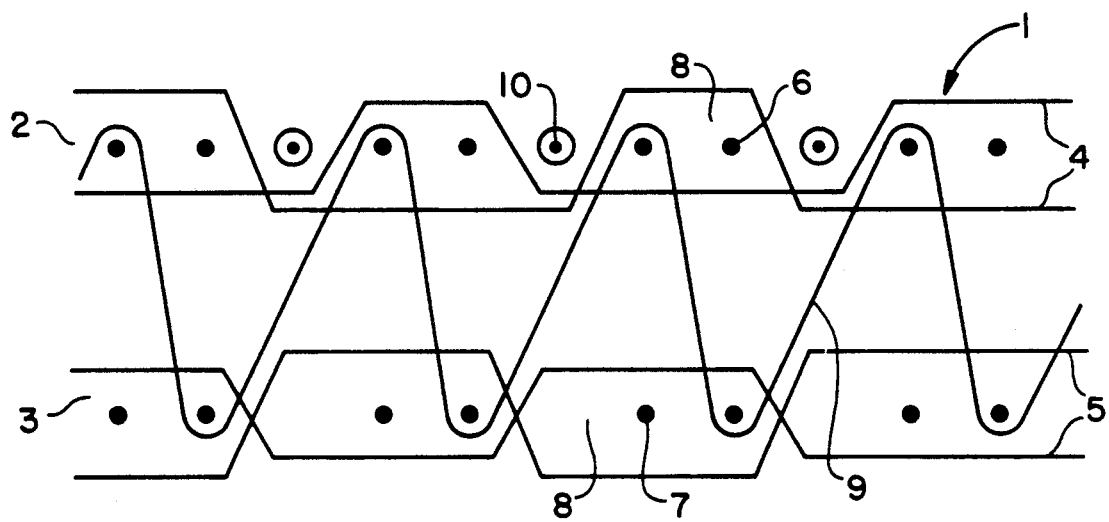

United States Patent [19]

Andre De La Porte et al.

[11] Patent Number: 5,175,034

[45] Date of Patent: Dec. 29, 1992

[54] DOUBLE CLOTH

[75] Inventors: Gilles Andre De La Porte, Rozendaal; Peter Van Der Vleuten, Gemert, both of Netherlands

[73] Assignee: Parabeam Industrie- en Handelsonderneming B.V., Al Helmond, Netherlands

[21] Appl. No.: 469,762

[22] Filed: Jan. 25, 1990

[30] Foreign Application Priority Data

Feb. 1, 1989 [NL] Netherlands .................... 3902940

[51] Int. Cl.⁵ .................... B32B 3/12; B32B 3/26; B32B 7/08; B32B 27/04; D03D 11/02
[52] U.S. Cl. .................... 428/36.1; 139/410; 428/116; 428/117; 428/188; 428/229; 428/236; 428/238; 428/247; 428/251; 428/252; 428/257; 428/259; 428/902
[58] Field of Search .................... 428/36.1, 116, 117, 428/188, 229, 236, 238, 247, 251, 252, 257, 259, 902; 139/410

[56] References Cited

U.S. PATENT DOCUMENTS 2,329,739  9/1943  Baker .
3,008,213  11/1961  Foster et al. .................... 139/410
3,048,198  8/1962  Koppelman et al. .................... 139/410
3,090,406  5/1963  Koppelman et al. .................... 139/410
3,234,972  2/1966  Koppelman et al. .................... 139/410
3,328,218  6/1967  Noyes .................... 139/410

FOREIGN PATENT DOCUMENTS 9000097  1/1990  European Pat. Off. .
2624140  6/1989  France .

*Primary Examiner*—James C. Cannon
*Attorney, Agent, or Firm*—Cushman, Darby & Cushman

[57] ABSTRACT

The present invention relates to a double cloth comprising a face cloth and a back cloth which are made of warp and weft threads and are held together by tied-in pile threads. To form a double plush cloth of high strength and stiffness it is provided that the warp and weft threads are each crossed by a warp thread float foundation weave, and additional cover weft threads essentially extended and floating on the outer surfaces of the face and/or back cloths are tied in by the warp threads, with adjacent cover weft threads being tied in by different warp threads of the particular face or back cloth.

11 Claims, 5 Drawing Sheets

DOUBLE CLOTH

The present invention relates to a double cloth comprising a face cloth and a back cloth which are made of warp and weft threads and are held together by connecting pile threads.

Such double cloths, by virtue of the pile-filled space between the face cloth and the back cloth, have a much better breaking and tensile strength than two-dimensional cloths. However, double cloths for industrial uses must combine their high strength with a high degree of stiffness and only a certain degree of flexibility which, in the event of local stress concentrations, ensures stress diversion without local fractures. By using high-strength fibers it has been possible to produce cloths of high strength and stiffness which, owing to their more favorable strength/weight ratio, can replace corrosion-sensitive reinforcing materials, such as steel. However, the use of high-strength fibers is not without its own problems since, on the one hand, these fibers are costly and, on the other, owing to their low breaking extension, they generally form only part of the fibers of the cloth.

It is an object of the present invention to provide a double cloth which combines high strength with high stiffness.

This object is achieved when the warp and weft threads are crossed and additional cover weft threads essentially extended and floating on the outer surfaces of the face and/or back cloths are tied in by the warp threads, with adjacent cover weft threads being tied in by different warp threads.

This produces a double cloth which, by virtue of the weave, the setting and the number of threads in the cloth, combines the existing good mechanical properties of uncut double cloths with a high degree of stiffness. It is thus possible to obtain a change in the physical properties of a cloth via a specific elaboration of the structure of a cloth. In fact, the property profile of the double cloth can be modified further still by a single- or two-sided arrangement of the cover weft threads and choice of fiber material. For instance, the cover weft threads can be designed as monofilament yarns which are less flexible than multifilament yarns and/or the cover weft threads may comprise high-strength fibers, for example carbon, glass, aramid, etc.

The tying-in of the cover weft threads by a fundamental weave which contains warp floats permits a uniform cloth construction, since the number of yarn cross-over points is smaller than in a plain weave, thereby making available free space for the cover weft threads. To produce such a fundamental weave, the warp and weft threads can form a transverse rib. The additional cover weft threads can be tied in by a sateen weave which weaves in the cover weft threads extended over dispersed binding places in the cloth. In this arrangement a cover weft can be tied in every two weft threads of the particular face or back cloth, preferably every 2 to 8 weft threads.

If the cover weft thread is solely tied in on the outer surface of the face cloth, the back cloth can be woven with missing wefts opposite the cover weft threads, which confers on the back cloth a looser setting which compensates for the space occupied by the cover weft threads to ensure an undistorted cloth structure.

The pile threads can be laid in by a V- or W-weave. Preferably, the pile threads are incorporated in a 2/4 weft pile weave. Uniform stress diversion can also be obtained by an offset binding-in of adjacent pile threads in the weft direction. The double cloth is preferably an uncut velour where the pile threads go from the face cloth to the back cloth, and vice versa, after having been woven-in in the warp direction along one or more weft threads. The length of the pile threads can vary between 0.1 and 50 mm. The face cloth and the back cloth can be positioned by the pile threads either esentially close to each other or spaced apart. The density of the pile threads can likewise vary between very dense and less dense and preferably is between 3 million pile threads/m$^2$ and 0.1 million pile threads/m$^2$. Preferably, the increase in the length of pile threads is associated with an increase in the density of the pile threads per m$^2$.

The face and back cloths made of warp and weft threads and also the pile threads and the cover weft threads can be made of natural, synthetic or mixed fibers, for example cotton, polyester, polyacrylonitrile or polyamide, or high-strength fibers, for example glass, boron, steel or carbon. The fibers used can either have been spun as staple fibers into yarns or take the form of mono- and/or multifilament yarns. It can be advantageous to use monofilament yarns for the pile threads, thereby significantly improving the springiness of the cloth.

Depending on the size and direction of the likely stresses, the face and back cloths can comprise identical or different fibers. For example, the warp threads can be made of polyester and the weft threads of aramid. On the other hand, the pile threads and the cover weft threads may also comprise polyester or aramid or some other kind of fiber.

Furthermore, the double cloth can form the reinforcing component of a composite or hybrid material containing a hardenable polymer matrix. The result is a composite or hybrid material which is less prone to cracking under external forces such as flexure, transverse force or transverse torsion, since the pile threads ensure stress deflection from the face cloth to the back cloth, or vice versa, and, owing to the cloth structure, has a high transverse stiffness. The property profile can consequently be adapted to stress situations by means of a modification of the cloth with cover wefts and/or choice of the fiber material. The splitting of the load between cloth and polymer matrix also depends on the volume content of the components. As regards this volume content, a weight ratio of cloth to polymer of 50:50 has proven advantageous. The volume content of the cloth can be changed and adapted, on the one hand, through choice of the density of the pile threads and cover weft threads and, on the other, through incorporation of a plurality of plies of the double cloth in the laminate. In making the laminate, double cloths with cover weft threads may be combined with double cloths without cover weft threads in superposed plies.

Suitable matrix polymers include inter alia the thermoplastics: polyamide, polypropylene, polybutylene terephthalate, polyethylene terephthalate, polyacetal, ABS and polycarbonate; the elastomers: rubber and polyurethane; and the thermosetting resins: unsaturated polyester (UP) resins, epoxy resins and vinyl esters.

Finally, the composite or hybrid material can be equipped with a water-repellent coating which is particularly suitable in shipbuilding. This coating can be a silicon rubber or polyurethane coating.

Other objects, features, and advantages of the invention will become more fully apparent upon consideration of the claims and the following description.

Figure 1A:
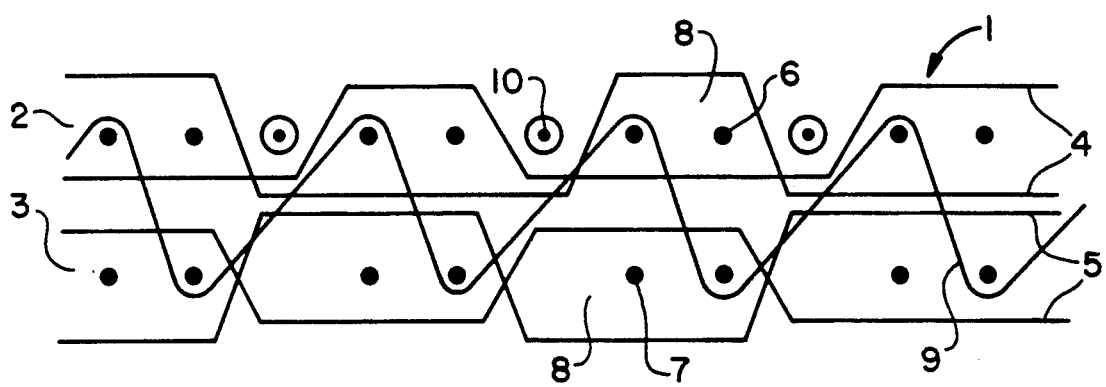
Figure 2:
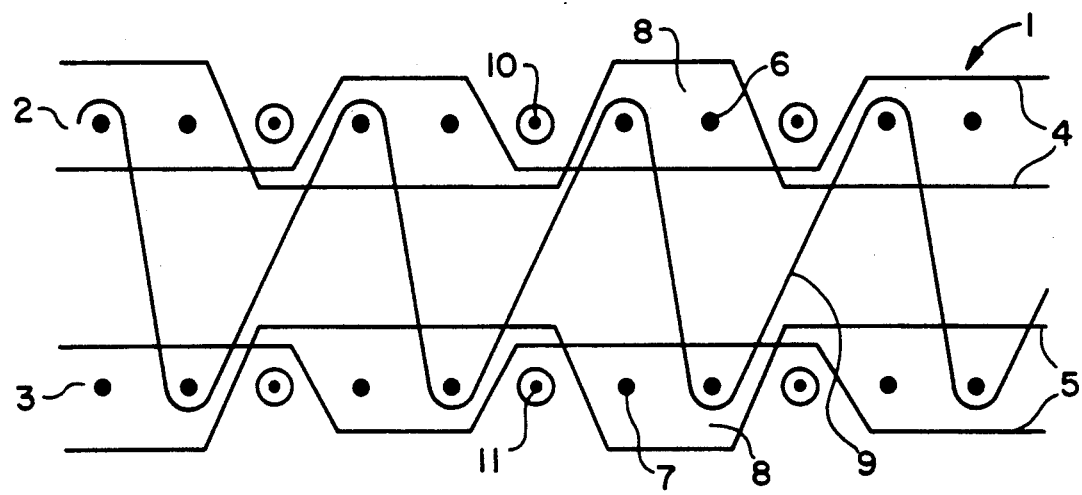
Figure 2A:
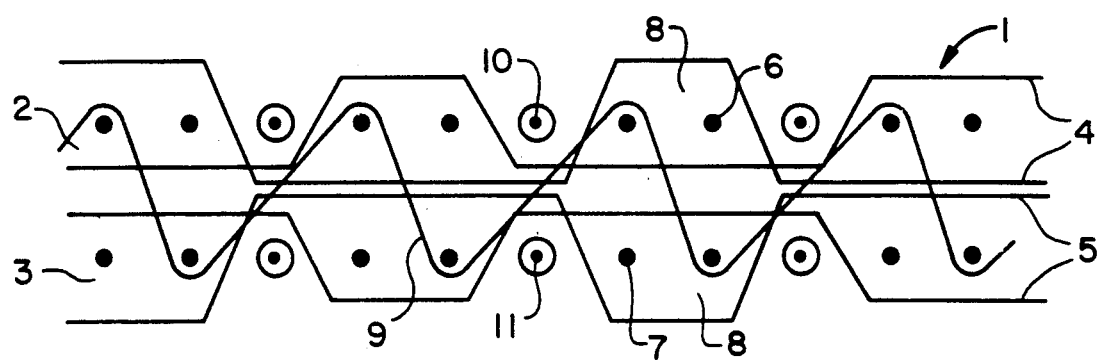

The invention will now be explained in more detail by reference to the depicted in the accompanying drawings, where FIGS. 1 and 1a show part of a section through a first embodiment of the double cloth perpendicular to the weft direction, FIGS. 2 and 2a show part of a section through a second embodiment of the double cloth perpendicular to the weft direction.

Figure 3:
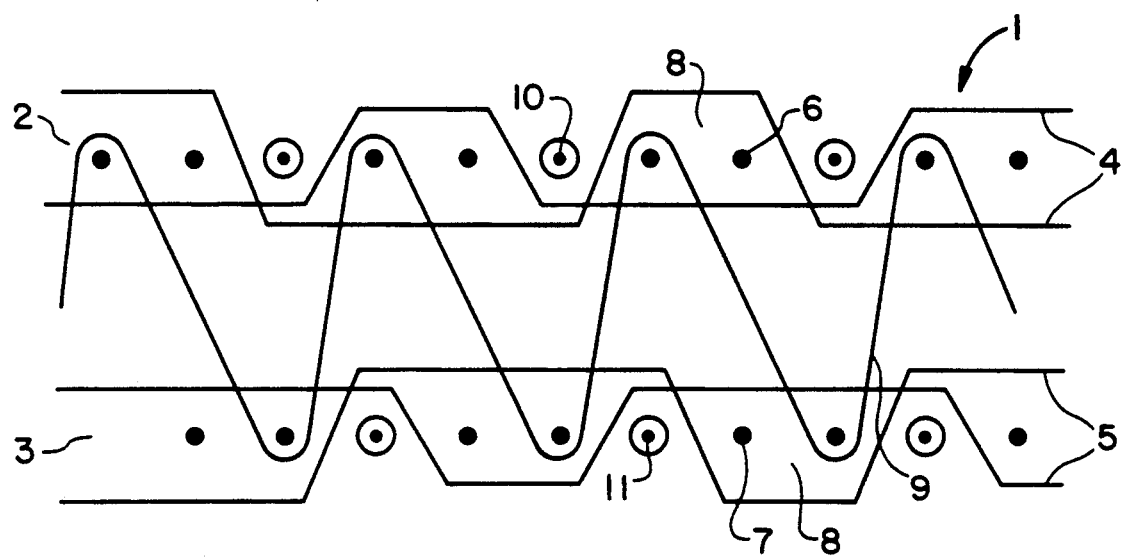
Figure 4A:
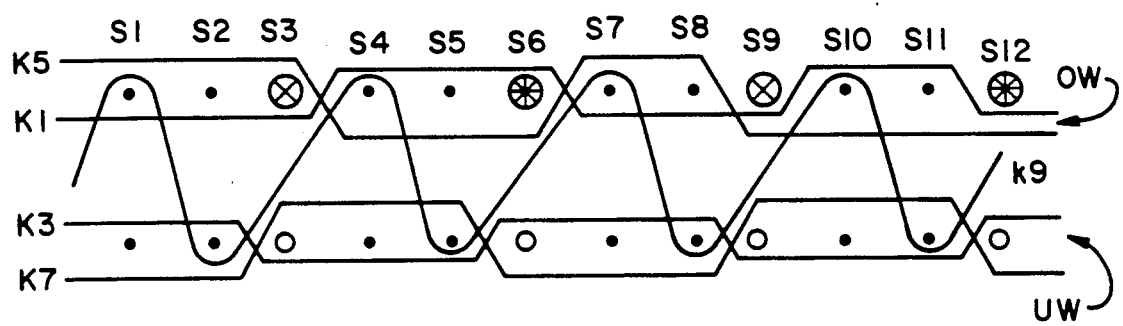
Figure 4B:
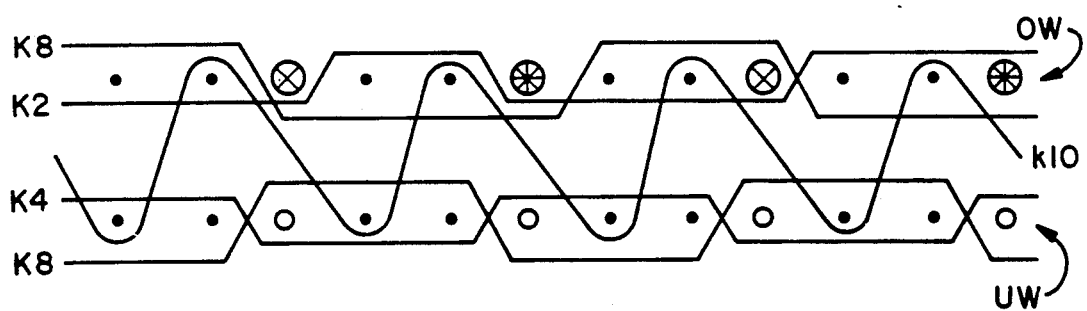
Figure 5A:
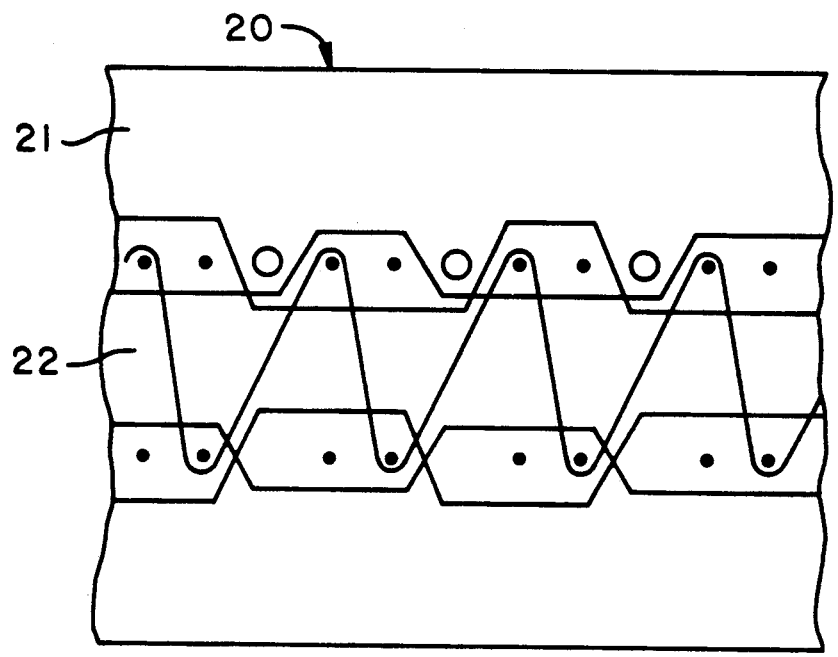
Figure 5B:
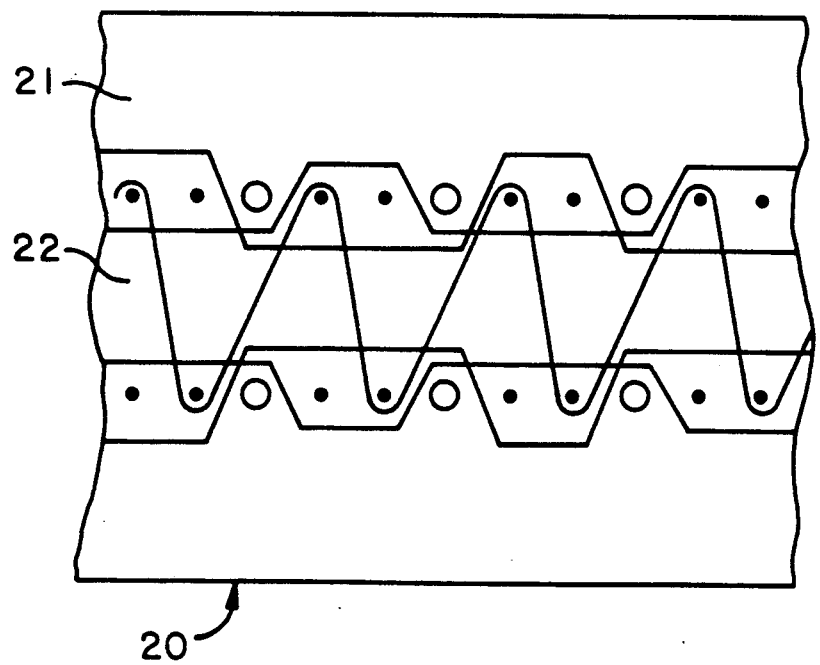

FIG. 3 shows part of a section through a third embodiment of the double cloth perpendicular to the weft direction, FIGS. 4a and 4b show the threadline perpendicular to the weft direction in the double cloth of the fourth embodiment and FIGS. 5a and 5b show part of a section through a first and a second embodiment of a composite or hybrid material.

FIGS. 1 and 1a show a first embodiment of an uncut double pile cloth 1 comprising a face cloth 2 and a back cloth 3. The face cloth 2 comprises warp threads 4 and the back cloth 3 comprises warp threads 5, which are each crossed with weft threads 6 and 7 respectively. The manner of crossing is derived from a plain weave by always inserting a plurality of wefts in the same plain weave shed 8, thereby forming warp thread floats. In this case, two weft threads 6 and 7 are inserted into a plain weave shed 8. The number of insertable weft threads can be up to 8 weft threads 6 and 7, preferably being 2 to 4 weft threads. The face cloth 2 and the back cloth 3 are held together by pile threads 9 which, tied-in in the warp direction, are looped alternatively around a weft thread 6 or 7. The pile threads 9 are tied in by a V-weave, preferably a 2/4 weft pile weave. The pile threads 9, however, can also be laid in by a 3/6W or ⅜W weft pile weave. The number of pile threads 9 per m$^2$ and the length of pile threads 9 can be adapted to the target cloth weight and/or the support desired from the pile threads 9. Compared with the binding of the pile threads 9 depicted in FIG. 1, it is possible to provide addtional pile thread which cross the pile threads 9, thereby arriving at an even denser arrangement of pile threads. In addition, pile threads 9 which are adjacent to each other in the weft direction are arranged on different weft threads 6 and hence off-set relative to each other.

The length of the pile threads 9 can vary between 0.1 and 50 mm. If, as depicted in FIG. 1, the face cloth 2 and the back cloth 3 are attached to each other spaced apart, then the length of the pile threads 9 is in general 1 to 50 mm, preferably 1.5 to 15 mm (in this instance 4 to 6 mm). The face and the back cloth are arranged spaced apart particularly in the case of glass fabrics, since this improves the deformability for stress diversions. However, as per FIG. 1a it is possible for the face cloth 2 and the back cloth 3 to be bonded to one another, by the pile threads 9 while matching each other. The density of the pile threads 9 is about 1.5 million pile threads/m$^2$ and is preferably between 3 million pile threads/m$^2$ and 0.1 million pile threads/m$^2$.

The outer surface of the face cloth 2 holds additional cover weft threads 10. These cover weft threads 10 each float between two plain weave sheds 8 and are individually tied in by the warp threads 4. To obtain an essentially extended arrangement of the cover weft threads 10 on the outer surface of the face cloth 2, the individual cover weft threads 10 float over a plurality, preferably 2 to 6, warp threads. Warp threads 4 and cover weft threads 10 are accordingly crossed by weaves where, in contrary to the twill weave, it is not always the nearest warp thread which binds the nearest weft thread. The fundamental weave utilized for binding in the cover weft threads 10 is a sateen weave. The rising numbers are preferably between 2 and 7. In the case of the sateen weave, the binding places are arranged in the cloth, here the face cloth 2, in a scattered pattern, ensuring a uniform distribution of the binding-in places on the outer surface. The number, yarn count and fiber type of the cover weft threads 10 tied in on the outer surface depends on the stiffness desired in the transverse and longitudinal directions. Besides an arrangement of the cover threads 10 for every two weft threads 6, the cover weft threads 10 can also be arranged for every 3 to 8 weft threads 6.

Further details concerning the binding and thread arrangement of the plush cloth are described in detail for a fourth embodiment with reference to FIGS. 4a and 4b.

The yarn count of the cover weft threads 10 is in the range between 10 and 200 tex. The fiber material used is a synthetic fiber, for example a polyester, polypropylene, polyacrylonitrile or polyamide fiber, which may take the form of spun, multifilament or monofilament yarns. Monofilament and their inherent high springiness are particularly suitable for the cover weft threads 10. However, it is possible to use high-strength fibers made of glass, boron, carbon, aramid etc. as fiber material for cover weft threads 10, which, owing to their good mechanical properties, additionally improve the stiffness, particularly the transverse stiffness, of the cloth construction.

The fiber material used for the yarns of the warp threads 4, 5 and the weft threads 6, 7 of the face and back cloths 2, 3 and also for the pile threads 9 can of course be natural and synthetic fibers but also blend fibers. The most important natural fiber is cotton, which ensures good adhesion in particular for plastics or rubber coating of the double cloth. The synthetic fibers which can be used include inter alia polyester, polypropylene, polyacrylonitrile and polyamide. It is also possible to use the high-strength fibers made of glass, boron nitride, aramid, carbon, etc. The synthetic and high-strength fibers generally take the form of staple fibers of multifilament yarns. The comparative thick monofilament yarns are likewise suitable for weaving the face and back cloths 2, 3 but are preferably only used for the pile threads 9 and/or, as mentioned above, for the cover weft threads 10.

In the first illustrative embodiment shown, the warp threads 4, 5, the weft threads 6, 7 and the pile threads 9 are made of the same synthetic fiber, for example polyester, or the same high-strength fiber, for example aramid, while the cover weft threads 10 can be made of another particularly strong fiber, for example carbon fiber. If the cloth 1 is to be particularly stressed only in one direction, for example in the warp direction or weft direction, then not only the cover weft threads 10 but also the warp threads 4, 5 or the weft threads 7 can be made of the particularly strong fiber, for example carbon fiber. A frequent choice for cost reasons are glass fibers which can be combined in the double cloth 1 with conventional synthetic fibers or other high-strength fibers. Finally, the four different fibers 4, 5; 6, 7; 9; 10 involved in the formation of double cloth 1 can be made of four different types of fibers.

FIGS. 2, 2a and 3 show a second and a third embodiment of the double cloth, which differ from the first embodiment only in that the back cloth 3 likewise has cover weft threads 11 on its outer surface. Whereas the first embodiment concerns a double cloth 1 with a single-faced cover weft 10, the second and third embodiments relate to double cloth 1 having cover wefts 10, 11 on both faces. The cover weft threads 11 of the back cloth 3 are individually tied in by the warp threads 5, the tying-in corresponding to the tying-in of the cover weft threads 10 via the warp threads 4. The remarks concerning cover weft threads 10 thus also apply to the cover weft threads 11. From FIG. 2, the cover weft threads 10 of the face cloth 2 and the cover weft threads 11 of the back cloth 3 are arranged immediately opposite one another, i.e. each between the same plain weave sheds 8. The pile-filled space consequently forms a plane of symmetry perpendicular to the plane of section.

In the third embodiment of FIG. 3, the cover weft threads 10 of the face cloth 2 and the cover weft threads 11 of the back cloth 3 are arranged offset relative to one another and the plain weave sheds of face cloth 2 and back cloth 3 are each offset by a weft thread 6, 7 in the warp direction by crossing of the warp threads 4, 5.

The double cloth depicted in FIGS. 4a and 4b comprises a face cloth 2, hereinafter referred to as FC, and a back cloth 3, hereinafter referred to as BC, which are each formed by a ground chain 4, 5 comprising warp ends E1, E2, E5, E6 and E3, E4, E7, E8 respectively and the weft chain 6, 7 comprising weft picks P1 to P12. Face cloth FC and back cloth BC are joined to one another by a pile chain 9 comprising pile ends E9 and E10, which are incorporated in a V-bind.

Face cloth FC and back cloth BC each form a transverse rib having a weft repeat of 12 and a warp repeat of 6.

Weft insertion is effected by inserting not only for the face cloth FC but also for the back cloth BC in each case two ground weft picks P1, P2; P4, P5; P7, P8 and P10, P11. Every third weft pick P3, P6, P9 and P12 in the face cloth FC is a special weft pick, the cover weft pick. The face cloth FC possesses two different cover weft picks, on the one hand the weft picks P3 and P9 and on the other the cover weft picks P6 and P12. The cover weft picks P3, P6, P9 and P12 together form a 12-end weft sateen of rising number 3. Accordingly, the cover weft picks P3, P6, P9 and P12 form floats which each extend over three warp ends if the pile warp ends E9 and E10 are ignored.

In the back cloth BC, the ground warp end E3, E4, E7 and E8 each carry groups of three successive picks P3-P5, P6-F8, P9-P11, P12-P2 of which P3, P6, P9 and P12 are missing picks which each lie underneath the cover weft picks P3, P6, P9, P12 of the face cloth FC.

Instead of the missing picks P3, P6, P9, P12 of the back cloth BC it could also be possible to provide special filling picks which would then lie smoothly within the ground chain of the back cloth BC; cf. FIGS. 4a and 4b. In contrast, the cover weft picks P3, P6, P9, P12 of the face cloth FC are tied in according to the sateen mentioned and therefore lie except for the offset binding places on the outer surface of the face cloth FC.

The pile warp ends E9 and E10 each tie in with the ground weft picks P1, P2, P4, P5, P7, P8, P10 and P11, alternatively with those of face and back cloth FC and BC, E9 and E10 being interlaced offset by a ground weft pick.

The double cloth is woven on 10 shafts which are subdivided into two shaft groups SH1 and SH2. The first shaft group SH1 receives the warp ends E1, E3, E5, E7 and E9 and the second shaft group SH2 receives the remaining warp ends E2, E4, E6, E8 and E10.

The threads of FIG. 4a form part of the first five warp threads gathered together in a first reed opening, while the threads of FIG. 4b belong to a second reed opening containing a further five warp threads.

FIGS. 5a and 5b show a first and a second embodiment of a laminate 20 of a composite or hybrid material comprising a polymer matrix 21 wherein the reinforcing cloth 22 comprises one of the above-described double plush cloths. The reinforcing cloth 22 has been embedded in the hardenable polymer matrix.

Plastics for the polymer matrix are thermoplastics, such as polyamides, polypropylene, polybutylene terephthalate, polyethylene terephthalate, polyacetal, acrylonitrile-butadiene styrene (ABS) copolymers and polycarbonate, elastomers such as rubber and polyurethane and thermosetting resins such as the unsaturated polyester (UP) resins, polyimide resins epoxies and vinyl esters. Another possible group is the large number of curable moldings compositions based on phenolic and amino resins.

FIG. 5a shows a laminate 20 containing a cloth ply 22 comprising a double cloth as per FIG. 1, while FIG. 5b shows a laminate containing a double plush cloth as per FIG. 2. In contrast from this, a laminate 20 can also contain a plurality of reinforcing cloths 22 in the form of a double cloth with a single- or double-faced cover weft arranged in plies, the face and back cloth of the reinforcing cloth 22 being attached to one another with or without spacing between. Finally, this combination may also comprise double cloths without cover weft and velour fabrics.

For a water-repellent embodiment of laminate 20, it may also be provided with a coating of, for example, silicone rubber.

Although the invention has been described in connection with what is presently considered to be the most practical and preferred embodiments, it is to be understood that the invention is not limited to the disclosed embodiments, but rather, is intended to vover various modifications and equivalent arrangements included within the spirit and scope of the appended claims.

What is claimed is:

1. A composite comprising a polymer matrix in combination with a matrix-reinforcing, three-dimensional double cloth comprising a face cloth and a back cloth formed of crossed warp and weft threads, said warp and weft threads being crossed by a warp thread float fundamental weave, woven-in pile threads connecting and maintaining said face cloth and back cloth in a superposed position, and cover threads essentially extending and floating on the outer surfaces of said face or back cloths or on both said face and back cloths, said cover weft threads being tied in the warp threads, with adjacent cover threads being tied in by different warp threads.

2. A composite as set forth in claim 1, wherein the polymer material is derived from a thermoplastic selected from the group consisting of polyamides, polypropylene, polybutylene terephthalate, polyethylene terephthalate, polyacetal, acrylonitrile-butadiene styrene copolymers, polycarbonate, elastomers and polyurethene.

3. A composite as set forth in claim 1, wherein the polymer material is a thermoplastic.

4. A composite as set forth in claim 1, wherein the polymer material is a thermosetting resin.

5. A composite as set forth in claim 1, wherein the face and back cloths and the pile threads comprise high-strength fibers.

6. A composite as set forth in claim 5, wherein the warp, weft, cover weft and pile threads comprise different high-strength fibers.

7. A composite as set forth in claim 1, wherein the pile threads are monofilament yarns.

8. A composite as set forth in claim 1, wherein the polymer material is derived from a thermosetting resin selected from the group consisting of unsaturated polyester resins, epoxy resins, polyimide resins, amino resins and phenolic resins.

9. A composite as set forth in claim 1, wherein a plurality of said double cloths have been embedded in the polymer matrix.

10. A composite as set forth in claim 1, wherein said double cloth has been completely impregnated by a polymer matrix.

11. A composite as set forth in claim 1, wherein the individual pile threads have been embedded in a polymer matrix spaced apart and with the inclusion of free space.

* * * * *